(12) United States Patent
Necker

(10) Patent No.: US 11,009,871 B2
(45) Date of Patent: May 18, 2021

(54) DISPLAY DEVICE

(71) Applicant: DAIMLER AG, Stuttgart (DE)

(72) Inventor: Marc Necker, Weil der Stadt (DE)

(73) Assignee: DAIMLER AG, Stuttgart (DE)

( * ) Notice: Subject to any disclaimer, the term of this patent is extended or adjusted under 35 U.S.C. 154(b) by 161 days.

(21) Appl. No.: 16/084,606

(22) PCT Filed: Mar. 10, 2017

(86) PCT No.: PCT/EP2017/000317
§ 371 (c)(1),
(2) Date: Sep. 13, 2018

(87) PCT Pub. No.: WO2017/157510
PCT Pub. Date: Sep. 21, 2017

(65) Prior Publication Data
US 2019/0079512 A1 Mar. 14, 2019

(30) Foreign Application Priority Data
Mar. 18, 2016 (DE) ...................... 10 2016 003 359.2

(51) Int. Cl.
*G05D 1/00* (2006.01)
*B60K 37/06* (2006.01)
(Continued)

(52) U.S. Cl.
CPC ........... *G05D 1/0061* (2013.01); *B60K 37/06* (2013.01); *G02F 1/133603* (2013.01); *G09G 3/3648* (2013.01); *B60K 2370/175* (2019.05)

(58) Field of Classification Search
CPC ................. G05D 1/0061; B60K 37/06; G02F 1/133603; G09G 3/3648; G09G 2370/175
See application file for complete search history.

(56) References Cited

U.S. PATENT DOCUMENTS 8,704,806 B2   4/2014  Hirakata et al.
9,064,471 B2   6/2015  Shibata et al.
(Continued)

FOREIGN PATENT DOCUMENTS

CN      101541593 A     9/2009
CN      101681603 A     3/2010
(Continued)

OTHER PUBLICATIONS

Search Report created on Mar. 15, 2017 in related DE Application No. 10 2016 003 359.2 (all cited references were previously submitted in an IDS on Sep. 13, 2018).
(Continued)

*Primary Examiner* — Navid Ziaeianmehdizadeh
*Assistant Examiner* — Sean P Quinn
(74) *Attorney, Agent, or Firm* — Patent Portfolio Builders PLLC

(57) ABSTRACT

Device and method for displaying a current driving mode of a vehicle, at least one of several driving modes of the vehicle is an autonomous driving mode. The device includes a display unit having a light source and an imaging unit interacting with the light source. A first controller controls the light source. The first controller is configured such that it meets a first technical qualification with regards to a reliability or safety criterion. The first controller only activates the light source in the event of the current presence of the autonomous driving mode. A second controller controls the imaging unit, the second controller is configured such that that it meets a second technical qualification with regards to the reliability or safety criterion. The first technical qualification corresponds to a higher degree of reliability or safety with regards to the reliability or safety criterion than the second technical qualification.

9 Claims, 2 Drawing Sheets

Figure 1:
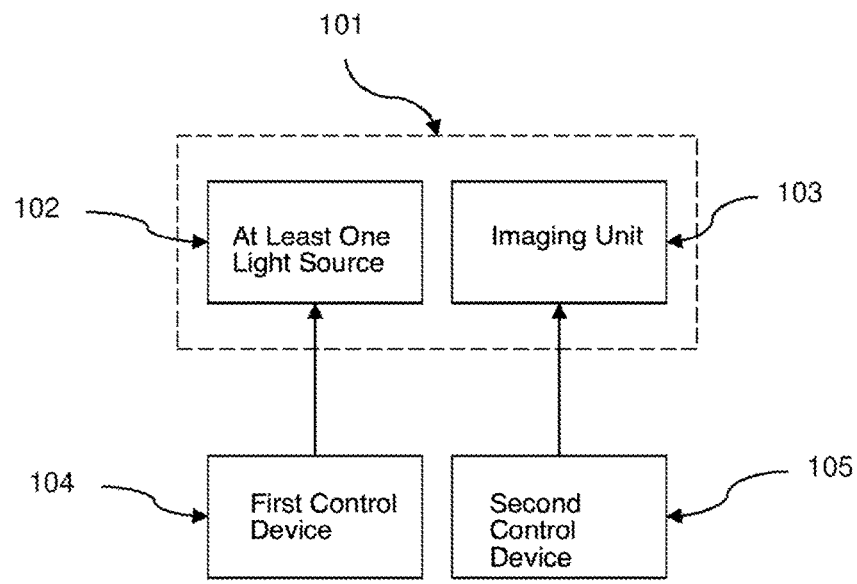

(51) Int. Cl.
*G02F 1/13357* (2006.01)
*G09G 3/36* (2006.01)

(56) References Cited

U.S. PATENT DOCUMENTS

| | | | |
|---|---|---|---|
| 9,174,650 | B2 | 11/2015 | Reilhac |
| 9,485,500 | B2 | 11/2016 | Kaule et al. |
| 9,519,287 | B1* | 12/2016 | Szybalski ............... B62D 1/286 |
| 10,062,336 | B2 | 8/2018 | Jahn |
| 2011/0164075 | A1 | 7/2011 | Suzuki et al. |
| 2014/0063045 | A1 | 3/2014 | Chang |
| 2015/0033357 | A1* | 1/2015 | Habel ..................... G06F 21/60 726/26 |
| 2015/0109340 | A1* | 4/2015 | Scherm ................... G09G 3/36 345/634 |
| 2015/0234580 | A1 | 8/2015 | Secord et al. |
| 2016/0267885 | A1* | 9/2016 | Meilinger ................ G09G 5/14 |
| 2017/0365225 | A1* | 12/2017 | Yoneyama ........ G02F 1/133603 |
| 2017/0371334 | A1* | 12/2017 | Nagy ..................... G05D 1/0061 |
| 2018/0224848 | A1* | 8/2018 | Vieux .................. G05D 1/0202 |

FOREIGN PATENT DOCUMENTS

| | | |
|---|---|---|
| CN | 102763154 A | 10/2012 |
| CN | 103680429 A | 3/2014 |
| CN | 105388613 A | 3/2016 |
| DE | 202005002844 U1 | 5/2005 |
| DE | 102004024515 A1 | 12/2005 |
| DE | 102012018290 A1 | 3/2014 |
| DE | 102013226167 A1 | 6/2015 |
| DE | 102014200559 A1 | 7/2015 |
| DE | 102015200292 A1 | 7/2016 |
| DE | 102015002973 A1 | 9/2016 |
| DE | 102015207354 A1 | 10/2016 |
| EP | 1847984 A1 | 10/2007 |
| JP | 10221787 A | 8/1998 |
| WO | 2011035880 A1 | 3/2011 |
| WO | 2014196445 A1 | 12/2014 |

OTHER PUBLICATIONS

International Search Report dated Jun. 27, 2017 in related International Application No. PCT/EP2017/000317.
Written Opinion dated Jun. 27, 2017 in related International Application No. PCT/EP2017/000317.
Office Action in corresponding/related China Application No. 2017800155714 dated Aug. 13, 2020.

* cited by examiner

DISPLAY DEVICE

BACKGROUND AND SUMMARY OF THE INVENTION

Exemplary embodiments of the invention relate to a device for displaying a current driving mode of a vehicle, in particular a motor vehicle, an electric vehicle or a hybrid vehicle that is set up for autonomous driving.

The term "autonomous driving of a vehicle" refers to a vehicle control device that completely autonomously or fully automatically controls the vehicle in a so-called "autonomous driving mode", without intervention by a driver. The term "autonomous driving mode" is presently identical to the term "fully autonomous driving mode". With such a vehicle, the longitudinal or transverse adjustment, in particular, for example, for driving on a road or for parking etc., is controlled in a completely automated manner by a central control unit of the vehicle in the autonomous driving mode.

In the "autonomous driving mode" understood in such a way, the responsibility for correct vehicle control or vehicle guidance thus lies with the central control unit of the vehicle and not with the driver. The driver can thus focus on other activities, for example reading a book, watching a film, having a discussion with other passengers, eating food etc.

To do so, the central control unit of the vehicle obviously has to meet correspondingly high reliability criteria and, where necessary, be designed to be repeatedly redundant.

Along with the "autonomous driving mode", such vehicles also typically have at least one "manual driving mode", in which the control of the vehicle is carried out in a known manner completely by the driver. In the "manual driving mode", the responsibility for the vehicle control or vehicle guidance thus lies completely with the driver of the vehicle.

Along with these two driving modes (autonomous/manual) mentioned above, there is also still a series of so-called "partially autonomous driving modes" in which the central control unit of the vehicle partially autonomously carries out the vehicle control or vehicle guidance, wherein the aspects of the vehicle control or vehicle guidance not carried out autonomously have to be fulfilled or carried out by the driver. In these driving modes, the driver takes on responsibility at least for partial aspects of the vehicle control or vehicle guidance. Examples for such "partially autonomous driving modes" are a radar-based distance control or a cruise control function.

In particular in the "autonomous driving mode", but also in the "partially autonomous driving modes", the driver must be reliably and currently informed that the "autonomous" or "partially autonomous driving mode" is active, and thus that the responsibility for the guidance and control of the vehicle lies completely with the vehicle itself, in the first instance, and partially in the second instance. Furthermore, the driver must be reliably and currently informed that a previously active "autonomous driving mode" is currently changing or will change in a foreseeable time, and thus the responsibility for the guidance or control of the vehicle is completely or partially transferred to the driver. The corresponding informing of the driver takes place by corresponding information output devices, for example for optical information output, acoustic information output, and/or haptically perceptible information output. Very high reliability requirements can be placed on the information output devices. In particular, this should prevent an information output device displaying to the driver the presence of an active "autonomous driving mode" even though at the time such an "autonomous driving mode" is not active.

Exemplary embodiments of the invention are directed to a device for displaying a current driving mode of a vehicle, wherein at least one of several driving modes of the vehicle is an autonomous driving mode that can be implemented reliably and cost effectively.

A first aspect of the invention relates to a device for displaying a current driving mode of a vehicle, wherein at least one of several driving modes of the vehicle is an autonomous driving mode. The device comprises a display unit that has at least one light source and an imaging unit that interacts with the light source, a first control device that controls the light source, wherein the first control device is designed and implemented in such a way that it meets a first technical qualification with regards to a reliability or safety criterion, and wherein the control device only activates the light source in the event of the current presence of the autonomous driving mode, and a second control device that controls the imaging unit, wherein the second control device is designed and implemented in such a way that it meets a second technical qualification with regards to the reliability or safety criterion, wherein the first technical qualification corresponds to a higher degree of technical reliability or safety with regards to the reliability or safety criterion than the second technical qualification.

The presence of an "active autonomous driving mode" is therefore displayed by the activation of the light source, i.e., by the illumination of the light source. Advantageously, the light source comprises several individual light sources, such that, in the event of a technical malfunction of an individual light source, it is nevertheless ensured that the light source illuminates.

The imaging unit is advantageously designed for emitting graphics, alphanumerical signs, animations etc. The feature, according to which "the light source interacts with the imaging unit", means, for example, that a graphical or alphanumerical output of the imaging unit only takes place with an active, i.e., illuminating, light source. Other kinds of interaction are also included by the inventive concept.

Advantageously, the first control device is also designed for the autonomous driving control of the vehicle. Furthermore, the first control device is, advantageously, identical to the central control unit mentioned in the description introduction, wherein the central control unit also controls the light source. Advantageously, the light source is controlled by a control unit that meets the technical reliability or safety requirements that are placed on the control unit for autonomous driving.

The device ensures that the display unit does not incorrectly display to the driver that the vehicle is in the automated driving mode even though it is actually currently in a manual/partially autonomous driving mode. The opposite case is far less critical. If, when the automated driving mode is actually present, it is not displayed that the vehicle is in this very same driving mode, then the driver furthermore assumes that he is driving manually/partially autonomously and bears the responsibility. This incorrect assumption would thus not have any grave consequences. It must therefore definitely be ensured that an incorrect display of the automatic driving mode is prevented, yet not displaying the automatic driving mode does not have to be definitively prevented.

Advantageously, the technical qualification of the first and second control device is defined by a technical standard with respect to the technical reliability or safety criterion. Advantageously, with respect to the technical reliability or safety criterion, the technical qualification of the first or the second control device corresponds to an ASIL level (ASIL=Automotive Safety Integrity Level), i.e. ASIL-A, ASIL-B, ASIL-C, ASIL-D, according to ISO 26262, and/or an SIL level (SIL=Safety Integrity Level), i.e. SIL-1, SIL-2, SIL-3, SIL-4, according to IEC 61508 or EN 61508 or EC 61511, and/or a DAL level (DAL=Design Assurance Level), i.e., DAL-A, DAL-B, DAL-C, DAL-D, DAL-E according to DO-178C, and/or a qualification according to an error rate per hour, and/or a qualification according to an error probability.

Advantageously, the first technical qualification of the first control device corresponds to the ASIL level ASIL-C or ASIL-D, or the SIL level SIL-3 or SIL-4, or the DAL level DAL-A or DAL-B, or an error rate of $<10^{-7}$ or $<10^{-8}$ or $<10^{-9}$ per hour. Advantageously, the first qualification of the first control device is identical to a qualification that a control device has to fulfil that controls an autonomous driving of the vehicle.

According to the invention, the first technical qualification of the first control device corresponds to a higher degree of technical reliability or safety in terms of the reliability or safety criterion than the second technical qualification of the second control device. Advantageously, the second qualification of the second control device corresponds to a reliability and safety qualification common in telematics systems in vehicles.

In an advantageous development of the proposed device, the display unit is a liquid crystal display having a liquid crystal matrix and a background illumination, wherein the imaging unit is the liquid crystal matrix that is controlled by the second control unit, and the light source is the background illumination that is controlled by the first control unit. The background illumination advantageously comprises one or more individual light sources, in particular one or more light diodes LEDs (LED=Light Emitting Diode) and/or organic light diodes OLEDs (OLED=Organic Light Emitting Diode). The liquid crystal display only enables the output of a piece of optical information when the background illumination is active. Presently, the background illumination displays the presence (background illumination on) or absence (background illumination off) of the autonomous driving mode with a very high degree of reliability (first qualification). The second control unit controls the crystal matrix, and thus defines the graphical or alphanumerically emitted piece of optical information. Independent of this piece of emitted optical information, the driver can recognize that the autonomous driving mode is active by the fact that even one piece of optical information is emitted. Because the control of the background illumination takes place with a higher degree of reliability than the control of the liquid crystal matrix, it can be ensured that even when, because of an error, the second control unit controls the liquid crystal matrix in such a way that a graphic were to be emitted, from which it can be seen that the autonomous driving mode is active, this graphic would not be visible to the driver because of the background illumination being switched off at that moment in time.

In an advantageous development of the proposed invention, the liquid crystal display has a background illumination device that is divided into a number O of regions, where O=2, 3, . . . , wherein the first control unit controls a number P of the regions, where P<O. In a simple case, the background illumination has two regions that have, for example, an identical surface. Thus, the first region, for example, forms the background illumination of the right-hand part of the display unit and the second region the background illumination of the left-hand part of the display unit. The first control unit exclusively controls the second region of the background illumination. Thus, if even one piece of optical information is visible to the driver in the left-hand part of the display unit, then this means that the autonomous driving mode is active. If the autonomous driving mode is not active, no optical information will be emitted on the left-hand part of the display unit; nonetheless, the right-hand part of the display unit (controlled by the second control unit) can be used for emitting optical information. This has the advantage that the display unit can be used to emit information when the "autonomous driving mode" is not present.

In an advantageous alternative development of the device, the display unit is a DLP projector (DLP=Digital Light Processing) that has a DMD chip (DMD=Digital Micromirror Device) and at least one illumination source, wherein the imaging unit is the DMD chip and is controlled by the second control unit, and the light source is the at least one illumination source and is controlled by the first control unit. Here, the control device of the DMD chip is defined by the second control unit, the emitted graphical, or alphanumerical piece of information. However, this piece of information is only visible when the illumination source or the illumination sources of the DMD chip are active. The illumination source or the illumination sources of the DMD chip are controlled by the first control unit with a high degree of technical reliability, such that, when the display unit generates even one optical output, the driver always recognizes that the autonomous driving mode is active. Advantageously, several differently colored illumination sources are present. Advantageously, the illumination sources are LEDs or OLEDs.

Advantageously, the DLP projector has a number N>1 of illumination sources, in particular differently colored illumination sources, wherein a number M of illumination sources is controlled by the first control unit, where M<N. Advantageously, the remaining N-M illumination sources are controlled by the second control unit.

In advantageous development of the device, only one, several, or all of the M illumination sources is/are activated to display the autonomous driving mode, the illumination sources being controlled by the first control unit, while all other N-M illumination sources for displaying the autonomous driving mode are inactive. Advantageously, M illumination sources have an identical light color, wherein the remaining N-M illumination sources do not have this color. In this case, the piece of emitted optical information always displays the presence of an autonomous driving mode when the optical output appears in the light color of the M illumination sources.

In an advantageous development of the device, the display unit is a head-up display, wherein the liquid crystal display described above or the DLP projector described above is part of the head-up display.

A further aspect of the invention relates to a vehicle having a device described above.

A further aspect of the invention relates to a method for displaying a current driving mode of a vehicle by means of a display unit that has at least one light source and one imaging unit interacting with the light source, wherein at least one of the several driving modes of the vehicle is an autonomous driving mode. The method comprises the following steps: In one step, controlling the light source takes place by means of a first control device, wherein the first control device is designed and implemented in such a way that it meets a first qualification with regards to a reliability or safety criterion, and wherein the control device only activates the light source in the event of the current presence of the autonomous driving mode. In a further step, controlling the imaging unit takes place by means of a second control device, wherein the second control device is designed and implemented in such a way that it meets a second qualification with regards to the reliability or safety criterion, wherein the first qualification corresponds to a higher degree of reliability or safety in terms of the reliability or safety criterion than the second qualification. It goes without saying that the two steps are in particular carried out temporally parallel, i.e. simultaneously.

Advantages as well as preferred developments of the method arise by an analogous and corresponding transfer of the statements previously made with respect to the proposed device.

BRIEF DESCRIPTION OF THE DRAWING FIGURES

Further advantages, features and details arise from the following description in which at least one exemplary embodiment is described in detail, if applicable with reference to the drawing. The same, similar and/or functionally identical parts are referred to with the same reference numerals.

Figure 2:
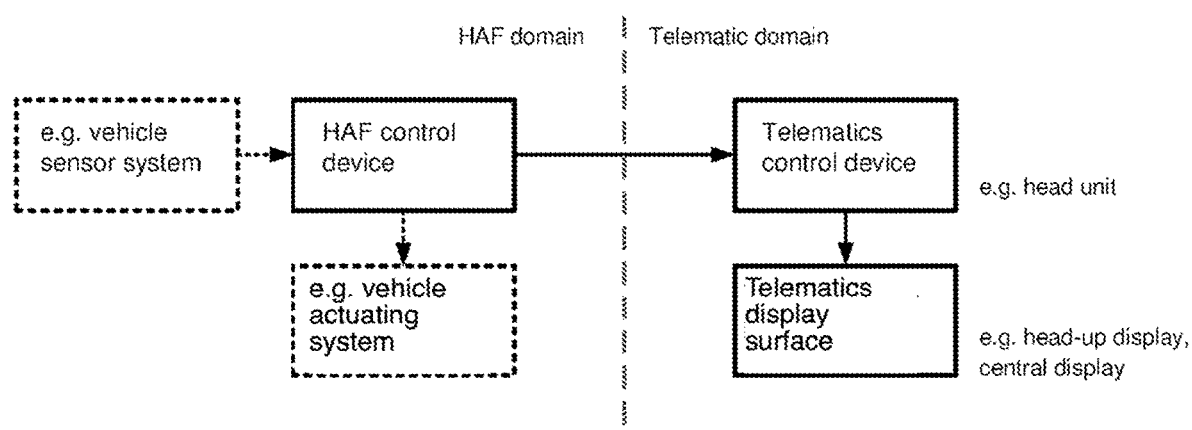
Figure 3:
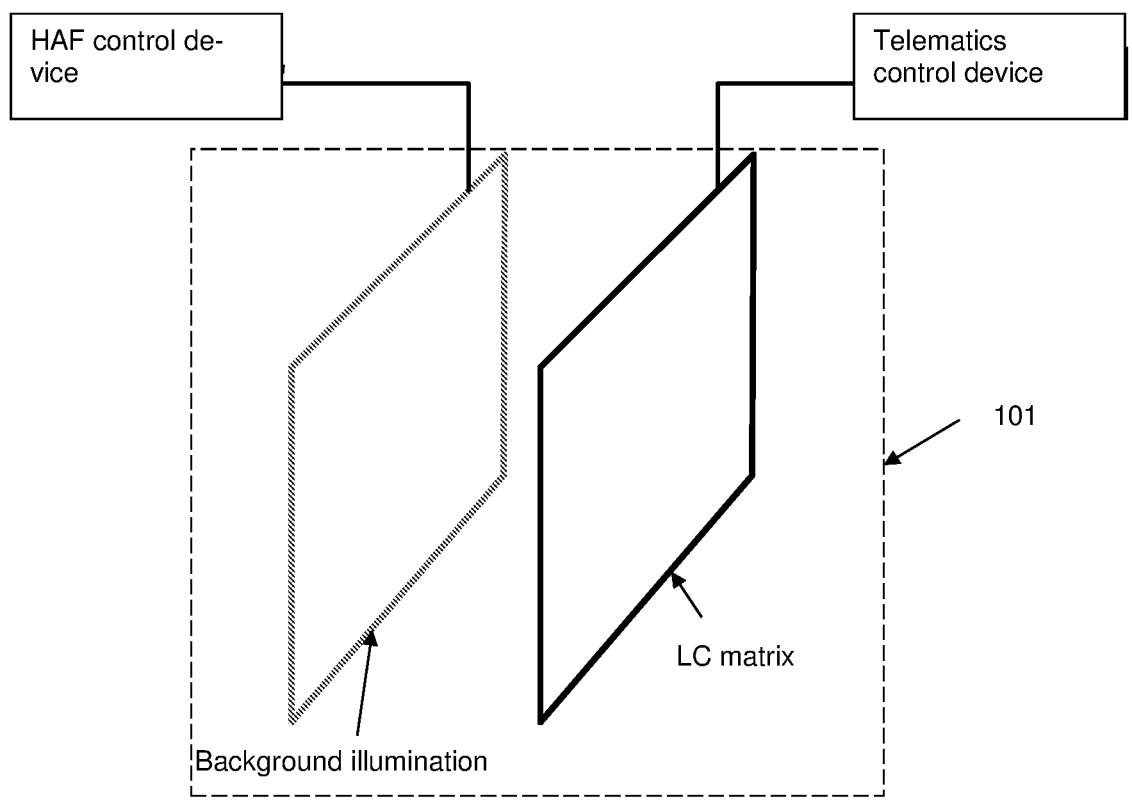

Here are shown:

FIG. 1 a schematic depiction of a construction of a device according to the invention, FIG. 2 exemplary system architecture of the proposed device and FIG. 3 exemplary embodiment of the display unit.

DETAILED DESCRIPTION

FIG. 1 shows a schematic depiction of a construction of a device according to the invention for displaying a current driving mode of a vehicle, wherein at least one of several driving modes of the vehicle is an autonomous driving mode. The device comprises a display unit 101 that has at least one light source 102 and an imaging unit 103 interacting with the light source 102. The device further comprises a first control device 104 that controls the light source 102, wherein the first control device 104 is designed and implemented in such a way that it meets a first qualification with regards to a reliability or safety criterion, and wherein the control device 104 only activates the light source 102 in the event of the current presence of the autonomous driving mode. The device further comprises a second control device 105 that controls the imaging unit 103, wherein the second control device 105 is designed and implemented in such a way that it meets a second qualification with regards to a reliability or safety criterion, wherein the first qualification corresponds to a higher degree of reliability or safety with regards to the reliability or safety criterion than the second qualification.

FIG. 2 shows an exemplary system architecture of the disclosed device for implementing an ASIL levelled display unit 101 within a motor vehicle. In the motor vehicle, generally a telematics component, for example a combi-display, a head unit display or a head-up display is suitable as the display unit 101. Typically, however, it is at least very complex to make a telematics component safe according to a high ASIL level. In contrast, the illumination of a single lamp, for example, according to ASIL can be easily ensured. Yet with automated driving, it is particularly desirable for this not to be signaled by a lamp, but rather for this to also be signaled by more complex depictions on the displays, for example by an animation or even by means of "augmented reality".

The disclosed device enables the realization of the two objects simultaneously, i.e., a correspondingly ASIL-ensured display of the automated driving mode, as well as the display of more complex animations or augmented reality within a telematics component.

The system architecture depicted in FIG. 2 comprises two domains. In the so-called "HAF domain" (HAF=Hoch-Automatisiertes Fahren, highly automated driving), there are dedicated control devices, which have a technical qualification according to a high ASIL level (4 or 5). This is necessary since omitting these components can have grave consequences during automatic driving.

Note: the term "automated driving", "highly automated driving" and "fully automated driving" are presently considered as the same in terms of content.

Meeting a high ASIL level for all devices is thus absolutely necessary within the HAF domain. On the other hand, the components of the telematics domain do not meet or only meet very low ASIL levels (e.g. ASIL-A). The currently active driving mode can thus be transmitted by a control device of the HAF domain having a high ASIL level in an ensured manner into the telematics domain; however, it can also initially not be received or displayed there according to a high ASIL level.

Here, the problem to actually be solved is to definitively prevent a highly automated driving mode being signaled, the vehicle, however, being in the manual/partially automated driving mode. The opposite case is far less critical. If, in the automated driving mode, it is not displayed that the vehicle is in this driving mode, then the driver further assumes that he is driving manually/partially automatically and bears the responsibility. This incorrect assumption would thus not have any grave consequences. It must therefore only definitely be ensured that a display is prevented, yet not displaying the automatic driving mode does not have to be definitively prevented.

FIG. 3 shows an exemplary embodiment of the display unit 101 in which the telematics display face is partially or completely provided with current from the HAF domains. The display unit is a liquid crystal display (LCD) which consists of a background illumination and the actual LC matrix in front of it. The two components are arranged directly behind each other. Here, the LC matrix can be switched in terms of pixels to be light permeable or light impermeable, such that a visible image only emerges when the background illumination is active. A telematics control device e.g., the head unit, controls the LC matrix. Here, the telematics control device can display any complex depictions and animations in order to signal an active automated driving mode. This does not have to take place in an ASIL qualified manner, whereby the telematics control device can further be implemented in a cost-effective manner. Furthermore, the HAF control device controls the background illumination i.e., the HAF control device provides the background illumination with power. Here, the HAF control device only provides the background illumination with power when the "automated driving mode" is active. Since the HAF control device is a component with a high ASIL level, this power supply can also be easily switched off or on with a correspondingly high degree of technical reliability, without causing additional relevant costs to do so.

Thus, it can be ensured that the driver can only see the display for the "automated driving mode" when the background illumination is supplied with power. In other words, regardless of which erroneous function the telematics control device has, it can always be definitively prevented that the driver does not get to see the display that signals an active "automated driving mode", even though this is not at all active.

A disadvantage of the variant of the device depicted in FIG. 3 is that the complete LCD display cannot be used when a highly automated driving mode is not at all active, since, in this case, the background illumination is not active. Thus, in a more advantageous variant of the invention, the background illumination is divided into two, for example into a right-hand and a left-hand part of the background illumination. The right-hand part of the background illumination is controlled by the HAF control device, wherein the left-hand part is constantly supplied with power. If the telematics control device carries out the display for an active highly automated driving operation in the right-hand display region, the same effect as in the variant of the device described above emerges for the right-hand part of the display device.

In a further variant of the device, the concept is transferred to a head-up display (HUD). Head-up displays can be operated as imagers by means of an LC display described above, such that the effect and the advantages of such a head-up display as described above emerge.

Furthermore, the disclosed device can be implemented as a head-up display (HUD) by means of a DMD projector (DMD=digital micromirror device). Here, a plurality of small micromirrors on a DMD chip deflects the light of one or more light sources into the projection direction in which there is typically a lens. Such a projector can be supplied, for example, by three separate light sources (LEDs) for the three primary colors red, green and blue, wherein the three primary colors are laid one on top of the other in temporally quick sequence for each pixel by the DMD chip. By mixing the three primary colors, a large number of different color tones can be generated at each pixel.

In a development of such a DMD projector, one of the three light sources is not supplied with power by the HAF control device. In addition, a display, which signals a highly automated driving operation, is depicted by the telematics control device exclusively in this color or in different lightness tones of this color. Then it is also ensured in the event of an erroneous function of the telematics control device that the display of the highly automated driving mode is not visible by the driver, since the corresponding light source is not supplied with power.

A substantial advantage is that two of the three light sources are still supplied with power when a highly automated driving mode is deactivated, such that an image can still be displayed on the HUD. It is here only disadvantageous that there is only one limited color space available for the remaining displays.

In a further variant, not one but two of the three light sources from the HAF domain are supplied with power. Correspondingly, the display as to whether or not the highly automated color mode is active is displayed in a mixture of these two colors. It goes without saying that red, green and blue light sources do not have to be exclusively used. Instead, the DMD projector can be operated with a random combination of differently colored light sources, for example with a white, a red and a blue light source. It is then a decision influenced by the desired design as to which of the light sources remains provided for the display of the highly automated driving operation. Herewith, the color space available for the respective displays can be correspondingly adjusted. Furthermore, not only three, but also four or more light sources can be added. Thus, it can be achieved that the whole color space is available for the remaining displays when the highly automated driving mode is not active, by, for example, a fourth light source being provided with current by the HAF domain.

Although the invention was illustrated and explained in more detail by preferred exemplary embodiments, the invention is thus not limited by the disclosed examples, and other variations can be derived from this by the person skilled in the art, without leaving the scope of protection of the invention. It is therefore clear that there is a plurality of possible variations. It is also clear that embodiments stated by way of example are only really examples which are not to be seen as limiting the scope, application possibilities or configuration of the invention in any way. Rather, the description above and the description of the figures enable the person skilled in the art to concretely implement the exemplary embodiments, wherein the person skilled in the art, knowing the disclosed inventive concept, can make various amendments, for example in terms of the function or the arrangement of individual elements mentioned in an exemplary embodiment, without leaving the scope of protection that is defined by the claims and their legal equivalences, such as further explanations in the description, for example.

The invention claimed is:

1. A vehicle device, comprising:
a display having at least one light source and an imaging unit interacting with the light source,
an autonomous driving control device that controls the light source, wherein the autonomous driving control device is configured such that it meets a first technical qualification with regards to a reliability or safety criterion, and the autonomous driving control device only activates the light source responsive to a current driving mode being an autonomous driving mode; and
a telematics control device that controls the imaging unit, wherein the telematics control device is configured such that it meets a second technical qualification with regards to the reliability or safety criterion, and the first technical qualification corresponds to a higher degree of reliability or safety with regards to the reliability or safety criterion than the second technical qualification, wherein the device displays a current driving mode of the vehicle, and at least one of several driving modes of the vehicle is the autonomous driving mode.

2. The device of claim 1, wherein the first and the second technical qualification with regards to the reliability or safety criterion are at least one of:
an Automotive Safety Integrity Level (ASIL),
a Safety Integrity Level (SIL),
a Design Assurance Level (DAL),
a qualification according to an error rate per hour, or
a qualification according to an error probability.

3. The device of claim 2, wherein the first technical qualification of the autonomous driving control device corresponds to:
an ASIL level ASIL-C or ASIL-D,
an SIL level SIL-3 or SIL-4,
a DAL level DAL-A or DAL-B, or
an error rate of $<10^{-8}$ or $<10^{-8}$ or $<10^{-9}$ per hour.

4. The device of claim 1, wherein the display unit is one of:
a liquid crystal display having a liquid crystal matrix and a background illumination, wherein the imaging unit is the liquid crystal matrix that is controlled by the telematics control device, and the light source is the background illumination that is controlled by the autonomous driving control device, or a digital light projector (DLP), having a digital micromirror device (DMD) chip and at least one illumination source, wherein the imaging unit is the DMD chip that is controlled by the telematics control device, and the light source is the at least one illumination source that is controlled by the autonomous driving control device.

5. The device of claim 4, wherein the DLP has a number N>1 of differently colored illumination sources, and a number M of illumination sources is controlled by the autonomous driving control device, where M<N.

6. The device of claim 5, wherein only one, several, or all of the M illumination sources is/are activated to display the autonomous driving mode, the illumination sources being controlled by the autonomous driving control device, while all the other N illumination sources are inactive to display the autonomous driving mode.

7. The device of claim 5, wherein the liquid display has a background illumination that is divided into a number O of regions, where O≥2, 3 . . . , wherein the autonomous driving control device controls a number P of the regions, where P<O.

8. A vehicle, comprising:
a device, which comprises
a display having at least one light source and an imaging unit interacting with the light source,
an autonomous driving control device that controls the light source, wherein the autonomous driving control device is configured such that it meets a first technical qualification with regards to a reliability or safety criterion, and the autonomous driving control device only activates the light source responsive to a current driving mode being an autonomous driving mode; and
a telematics control device that controls the imaging unit, wherein the telematics control device is configured such that it meets a second technical qualification with regards to the reliability or safety criterion, and the first technical qualification corresponds to a higher degree of reliability or safety with regards to the reliability or safety criterion than the second technical qualification,
wherein the device displays a current driving mode of the vehicle, and at least one of several driving modes of the vehicle is the autonomous driving mode.

9. A method for displaying a current driving mode of a vehicle using a display unit having at least one light source and an imaging unit interacting with the light source, wherein at least one of several driving modes of the vehicle is an autonomous driving mode, the method comprising:
controlling the light source by an autonomous driving control device, wherein the autonomous driving control device is configured such that it meets a first technical qualification with regards to a reliability or safety criterion, and the autonomous driving control device only activates the light source in the event of the current presence of the autonomous driving mode; and
controlling the imaging unit by a telematics control device, wherein the telematics control device is configured such that it meets a second technical qualification with regards to the reliability or safety criterion, wherein the first technical qualification corresponds to a higher degree of reliability or safety with regards to the reliability or safety criterion than the second technical qualification.

* * * * *